(12) United States Patent
Camenisch et al.

(10) Patent No.: US 10,250,591 B2
(45) Date of Patent: *Apr. 2, 2019

(54) PASSWORD-BASED AUTHENTICATION

(71) Applicant: International Business Machines, Armonk, NY (US)

(72) Inventors: Jan Leonhard Camenisch, Rueschlikon (CH); Anja Lehmann, Rueschlikon (CH); Gregory Neven, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/042,241

(22) Filed: Feb. 12, 2016

(65) Prior Publication Data

US 2017/0237725 A1 Aug. 17, 2017

(51) Int. Cl.
*H04L 9/32* (2006.01)
*H04L 29/06* (2006.01)
(Continued)

(52) U.S. Cl.
CPC ............ *H04L 63/083* (2013.01); *H04L 9/008* (2013.01); *H04L 9/0618* (2013.01); *H04L 9/085* (2013.01);
(Continued)

(58) Field of Classification Search
USPC .............................. 713/171, 184, 168; 726/4
See application file for complete search history.

(56) References Cited

U.S. PATENT DOCUMENTS 6,058,188 A 5/2000 Chandersekaran
6,084,968 A 7/2000 Kennedy
(Continued)

FOREIGN PATENT DOCUMENTS

CN 102333308 A 1/2012

OTHER PUBLICATIONS

Lee, Songwon et al. "Threshold password-based authentication using bilinear pairings." EuroPKI. 2004.
(Continued)

*Primary Examiner* — Amare F Tabor
(74) *Attorney, Agent, or Firm* — Harrington & Smith

(57) ABSTRACT

A system has $\lambda \geq 2$ servers. At least each of a set of authentication servers stores a key-share $sk_i$ of secret key sk, shared between q of the $\lambda$ servers, of a key-pair (pk, sk). An access control server sends an authentication value to a subset of the authentication servers. The authentication value was formed using a predetermined function of a first ciphertext for a user ID and a second ciphertext produced by encrypting a password attempt under public key pk using a homomorphic encryption algorithm. The authentication value decrypts to a predetermined value if the password attempt equals the user password for that user ID. Each authentication server in the subset produces a decryption share dependent on the authentication value using the key-share $sk_i$. The access control server uses decryption shares to determine if the authentication value decrypts to the predetermined value, if so permitting access to a resource.

22 Claims, 4 Drawing Sheets

(51) Int. Cl.
*H04L 9/00* (2006.01)
*H04L 9/06* (2006.01)
*H04L 9/08* (2006.01)

(52) U.S. Cl.
CPC ........ *H04L 63/0435* (2013.01); *H04L 63/061* (2013.01)

(56) References Cited

U.S. PATENT DOCUMENTS

| | | | |
|---|---|---|---|
| 6,829,356 B1 | 12/2004 | Ford | |
| 7,146,009 B2 | 12/2006 | Andivahis | |
| 7,359,507 B2 | 4/2008 | Kaliski | |
| 7,725,730 B2 * | 5/2010 | Juels | H04L 63/083 340/5.85 |
| 7,912,213 B2 | 3/2011 | Rubin | |
| 9,015,489 B2 * | 4/2015 | Belenkiy | H04L 9/0841 713/182 |
| 9,118,661 B1 * | 8/2015 | Juels | H04L 63/0838 |
| 9,258,113 B2 * | 2/2016 | Schneider | H04L 9/0844 |
| 9,374,221 B1 * | 6/2016 | Juels | H04L 9/321 |
| 9,515,996 B1 * | 12/2016 | Juels | H04L 63/0428 |
| 9,537,658 B2 | 1/2017 | Camenisch | |
| 9,596,086 B2 | 3/2017 | Camenisch | |
| 2002/0067832 A1 | 6/2002 | Jablon | |
| 2003/0147536 A1 | 8/2003 | Andivahis | |
| 2003/0163737 A1 * | 8/2003 | Roskind | G06F 21/31 726/6 |
| 2003/0221102 A1 | 11/2003 | Jakobsson | |
| 2003/0229788 A1 | 12/2003 | Jakobsson | |
| 2007/0297614 A1 | 12/2007 | Rubin | |
| 2008/0165972 A1 | 7/2008 | Worthington | |
| 2011/0099616 A1 * | 4/2011 | Mazur | H04L 63/0846 726/7 |
| 2011/0126024 A1 | 5/2011 | Beatson | |
| 2012/0131656 A1 * | 5/2012 | Slaton | H04L 63/083 726/6 |
| 2013/0080787 A1 * | 3/2013 | Lee | H04L 9/3234 713/183 |
| 2014/0189808 A1 * | 7/2014 | Mahaffey | H04L 63/0853 726/4 |
| 2014/0281571 A1 | 9/2014 | Federspiel | |
| 2017/0019261 A1 * | 1/2017 | Mandal | H04L 9/3271 |

OTHER PUBLICATIONS

MacKenzie, Philip, Thomas Shrimpton and Markus Jakobsson. "Threshold password-authenticated key exchange." Annual International Cryptology Conference. Spinger Berlin Heidelberg, 2002.

Jablon, David P. "Password authentication using multiple servers." Cryptographers' Track at the RSA Conference. Springer Berlin Heidelberg. 2001.

Desmedt, Y. et al. "Threshold Cryptosystems" Advances in Cryptology—CRYPTO '89, 9th Annual International Cryptology Congerence, Aug. 1989. (pp. 307-315).

EMC Corporation, "RSA Distributed Credential Protection" White Paper, Oct. 2012. (pp. 1-6). Available at: http://emc.com/collateral/software/white-papers/h11013-rsa-dcp-0812-wp.pdf.

Herzberg, A. et al. "Proactive Secret Sharing or How to Cope With Perpetual Leakage" Advances in Cryptology—CRYPTO'95, 15th Annual International Cryptology Conference, Aug. 1995. (pp. 339-352).

IBM Appendix P.

* cited by examiner

PASSWORD-BASED AUTHENTICATION

BACKGROUND

The present invention relates generally to password-based authentication, and more specifically to password-based authentication in plural-server systems whereby access to a resource is controlled in dependence on authentication of user passwords by the server system.

Passwords are still the most prevalent mechanism for user authentication in data processing systems. In conventional password-based authentication systems, users connect to a server which controls access to the protected resource and maintains a database of user IDs, e.g. user names, with their associated user passwords stored in simple hashed form. To authenticate a user, the server verifies if a password newly-supplied by the user yields the same hash value. If the access control server is compromised, however, user passwords are vulnerable to offline attacks using dictionaries or brute-forcing of the message space. As current graphical processors can test many billions of combinations per second, security should be considered lost as soon as an offline attack can be mounted against the password data.

To reduce exposure to an offline attack through server compromise, password-based authentication can be performed by a plurality of servers. Authentication data can be split between servers, and the user then interacts with all servers in the authentication protocol since information of all servers is required for authentication. This improves security, as more than one server must be hacked for user passwords to be compromised. One example of a two-server authentication system is described in "A New Two-server Approach for Authentication with Short Secrets", Brainard et al., USENIX 2003.

SUMMARY

According to at least one embodiment of the present invention there is provided a system having $\lambda \geq 2$ servers comprising an access control server and a set of authentication servers for communication with the access control server via a network. The access control server is operable for communication with user computers via the network and for controlling access by the user computers to a resource in dependence on authentication of user passwords associated with respective user IDs. At least each authentication server stores a respective key-share $sk_i$ of a secret key sk, shared between a plurality q of the $\lambda$ servers, of a cryptographic key-pair (pk, sk) where pk is a public key of the key-pair. The access control server stores, for each user ID, a first ciphertext produced by encrypting the user password associated with that user ID under the public key pk using a homomorphic encryption algorithm. In response to receipt from a user computer of a user ID and an authentication value, the access control server is adapted to send the authentication value to at least a subset of the authentication servers. The authentication value comprises a predetermined function of the first ciphertext for that user ID and a second ciphertext produced by encrypting a password attempt under the public key pk using the homomorphic encryption algorithm such that the authentication value decrypts to a predetermined value if the password attempt equals the user password for that user ID. At least each authentication server is adapted, in response to receipt of the authentication value, to produce a decryption share dependent on the authentication value using the key-share $sk_i$ thereof. Each authentication server is adapted to send its decryption share to the access control server, and the access control server is adapted to use the decryption shares of a plurality of the $\lambda$ servers to determine if the authentication value decrypts to said predetermined value, if so permitting access to the resource by the user computer.

Respective further embodiments of the present invention provide methods performed by an access control server and a user computer of such systems.

Embodiments of the invention will be described in more detail below, by way of illustrative and non-limiting example, with reference to the accompanying drawings.

DETAILED DESCRIPTION

Figure 1:
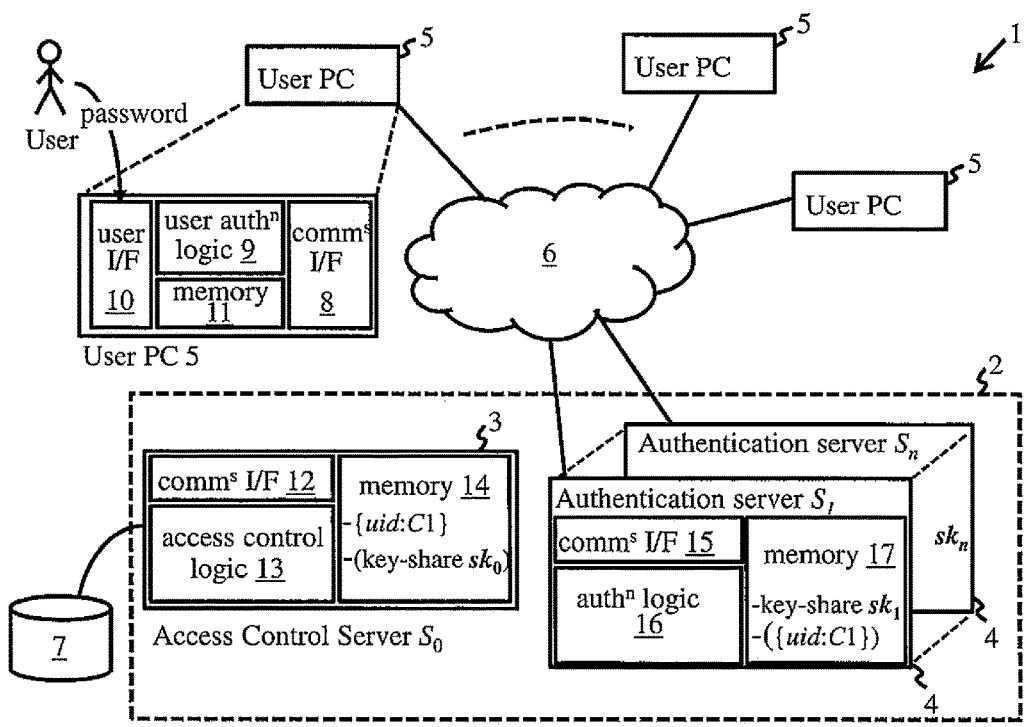
FIG. 1 is a schematic representation of a data processing system including a server system in one possible embodiment.

FIG. 1 is a schematic block diagram of a data processing system 1 incorporating a server system 2 embodying the invention. The server system 2 comprises $\lambda \geq 2$ servers. These comprise an access control server 3, denoted by $S_0$, and a set of $n \geq 1$ authentication servers 4, denoted by $S_1$ to $S_n$. The access control server 3 is adapted for communication with the authentication servers 4 and a plurality of user computers 5 via a network 6. The network 6 may in general comprise one or more component networks and/or internetworks, including the Internet. The user computers 5 are indicated as general-purpose personal computers (PCs) in this example, but may equally be implemented by other computer devices such as mobile phones, tablet computers, personal music players, palmtop devices, etc. The n authentication servers 4 are adapted to cooperate with the access control server 3 to implement a password authentication protocol detailed below. In particular, access control server 3 controls access by user computers 5 to a resource, in this example a database 7. Access is permitted in dependence on authentication of user passwords which are associated with respective user IDs, e.g. user names, and which are input by users via PCs 5 in operation.

The number ii of authentication servers can vary for different embodiments. In embodiments, n>1 whereby system 1 comprises $\lambda \geq 3$ servers. In general, higher values of n offer greater system security, and the value of n can be selected as desired depending on the particular password authentication protocol and required level of security. The authentication servers 4 may be located at the same location as access control server 3 or at one or more different locations, and may be controlled by the same entity as the access control server or by one or more different entities. Distribution and control of the servers 3, 4 can thus be selected according to security requirements for a given system.

A high-level abstraction of functional components of the servers 3, 4 and user PCs 5 is shown in FIG. 1. Each user PC 5 is indicated simply here as comprising a communications interface 8 for communicating with access control server 3 over network 6, user authentication logic 9 providing functionality for use in the authentication scheme to be described, a user interface 10 for data input/output interactions with the PC user, and memory 11 for storing data used by logic 9 in operation of the authentication scheme. Access control server 3 is indicated as comprising a communications interface (I/F) 12 for communications via network 6, access control logic 13, and memory 14. The access control logic 13 provides functionality for implementing steps of the authentication procedure and related operations detailed below. Memory 14 stores various data used by the control logic 13 in operation. This includes a data set {uid:C1} containing a first ciphertext C1, described further below, for the user ID uid of each registered user of server system 2. In embodiments, the access control server 3 also stores a key-share $sk_0$ of a secret key sk discussed below. Each authentication server 4 is similarly shown as comprising a communications interface 15, server authentication logic 16 and memory 17. Server authentication logic 16 provides functionality for use in the authentication and related operations described below. Memory 17 stores data used by server authentication logic 16 in operation. In particular, at least each authentication server $S_{i=1\ to\ n}$ stores a respective key-share $sk_i$ of a secret key sk of a cryptographic key-pair (p/c, sk), where pk is a public key of the key-pair. The secret key sk is shared between a plurality q of the λ servers. Hence, in systems where n=1, and so λ=2, the access control server $S_0$ necessarily stores a key-share $sk_0$. In systems where n>1, at least each of the n authentication server $S_1$ to $S_n$ stores a respective key-share $sk_i$ to $sk_n$, and the access control server $S_0$ may also store a key-share $sk_0$. The key-shares $sk_i$ are secret to respective servers $S_i$. The public key pk is published in system 1 and is therefore available to all servers 3, 4 and user PCs 5. In additional embodiments below, memory 17 of each authentication server 4 also stores the data set {uid:C1}.

Logic 9, 13 and 16 of user computers 5 and servers 3, 4 can be implemented, in general, by hardware or software or a combination thereof. Each of the functional blocks of devices 2, 3, 5 in FIG. 1 may be implemented by one or more functional components which may be provided by one or more computers. In particular, each device 2, 3, 5 may be implemented by computing apparatus comprising one or more general- or special-purpose computers, each comprising one or more (real or virtual) machines, providing functionality for implementing the operations described herein. The logic 9, 13, 16 of these devices may be described in the general context of computer system-executable instructions, such as program modules, executed by a computing apparatus. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 2:
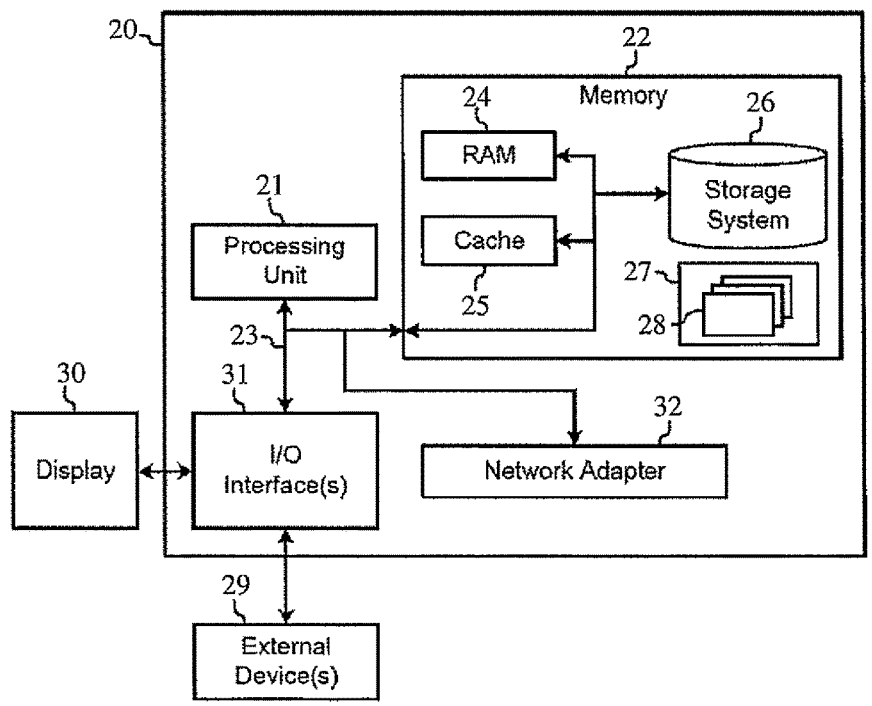
FIG. 2 is a generalized schematic of a computer in the system of FIG. 1.

FIG. 2 is a block diagram of exemplary computing apparatus for implementing a computer of system 1. The computing apparatus is shown in the form of a general-purpose computer 20. The components of computer 20 may include processing apparatus such as one or more processors represented by processing unit 21, a system memory 22, and a bus 23 that couples various system components including system memory 22 to processing unit 21.

Bus 23 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 20 typically includes a variety of computer readable media. Such media may be any available media that is accessible by computer 20 including volatile and non-volatile media, and removable and non-removable media. For example, system memory 22 can include computer readable media in the form of volatile memory, such as random access memory (RAM) 24 and/or cache memory 25. Computer 20 may further include other removable/non-removable, volatile/non-volatile computer system storage media. By way of example only, storage system 26 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 23 by one or more data media interfaces.

Memory 22 may include at least one program product having one or more program modules that are configured to carry out functions of embodiments of the invention. By way of example, program/utility 27, having a set (at least one) of program modules 28, may be stored in memory 22, as well as an operating system, one or more application programs, other program modules, and program data. Each of the operating system, one or more application programs, other program modules, and program data, or some combination thereof, may include an implementation of a networking environment. Program modules 28 generally carry out the functions and/or methodologies of embodiments as described herein. A program product may comprise a computer-readable storage medium (e.g., device) that does not comprise propagating signals.

Computer 20 may also communicate with: one or more external devices 29 such as a keyboard, a pointing device, a display 30, etc.; one or more devices that enable a user to interact with computer 20; and/or any devices (e.g., network card, modem, etc.) that enable computer 20 to communicate with one or more other computing devices. Such communication can occur via Input/Output (I/O) interfaces 31. Also, computer 20 can communicate with one or more networks such as a local area network (LAN), a general wide area network (WAN), and/or a public network (e.g., the Internet) via network adapter 32. As depicted, network adapter 32 communicates with the other components of computer 20 via bus 23. It should be understood that although not shown, other hardware and/or software components could be used in conjunction with computer 20. Examples include, but are not limited to: microcode, device drivers, redundant processing units, external disk drive arrays, RAID systems, tape drives, and data archival storage systems, etc.

Figure 3:
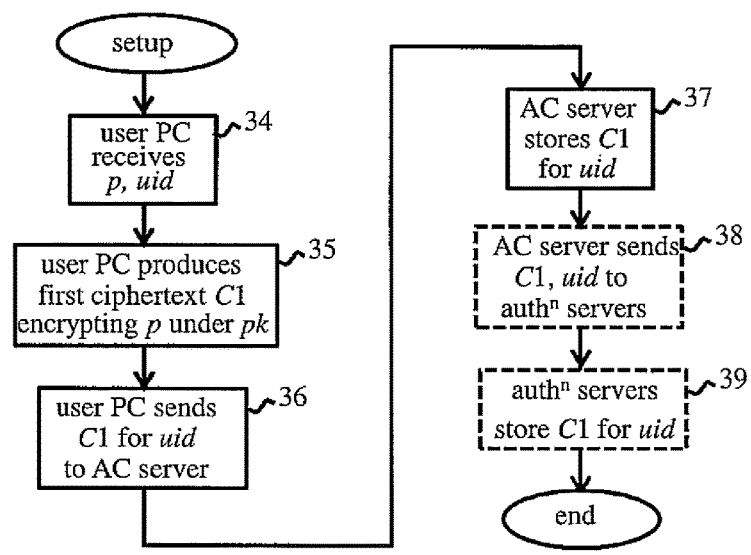
FIG. 3 indicates steps performed in a setup operation of the system of FIG. 1.

FIG. 3 indicates steps of a setup operation for registering a user with server system 2. This setup operation is performed when a new user connects to access control (AC) server 3 from a user PC 5 over network 6 to request a user account. On initiation of the setup procedure, the user ID uid and associated user password p to be used for subsequent authentication of the user are input to user PC 5 in step 34 of FIG. 3. In a typical scenario, the user password p is selected by the user and input via user I/F 10 of PC 5. The user ID uid may also be input by the user, or may be allocated by AC server 3 and supplied to PC 5 via communications interface 8. In step 35, the user authentication logic 9 of PC 5 produces a first ciphertext C1 by encrypting the user password p under the public key pk of the key-pair (pk, sk) discussed above. This ciphertext C1 is produced using a homomorphic encryption algorithm Enc. That is, the encryption scheme has a homomorphic property, whereby there exists an efficient operation $\odot$ on ciphertexts C such that, if $C_1 \in Enc_{pk}(m_1)$ and $C_2 \in Enc_{pk}(m_2)$, then $C_1 \odot C_2 \in Enc_{pk}(m_1 \cdot m_2)$ for a group operation "·". (In the following, we will use exponents to denote the repeated application of $\odot$, e.g. $C^2$ to denote $C \odot C$). In general, the first ciphertext C1 may encrypt the user password p per se or some function thereof as discussed below. In step 36, logic 9 of PC 5 sends the first ciphertext C1 to AC server 3 via network 6. In response to receipt of the first ciphertext C1 for a new user ID uid, in step 37 the AC logic 13 of AC server 3 stores C1 for uid in the data set {uid:C1} in memory 14. The dashed boxes in the figure indicate further setup steps of additional embodiments below. In these additional embodiments, AC logic 13 sends the first ciphertext C1 and new uid via network 6 to authentication servers $S_1$ to $S_n$ in step 38. In step 39, the server authentication logic 16 of each authentication server 4 then stores C1 for uid in memory 17. This completes setup for the new user account.

Figure 4:
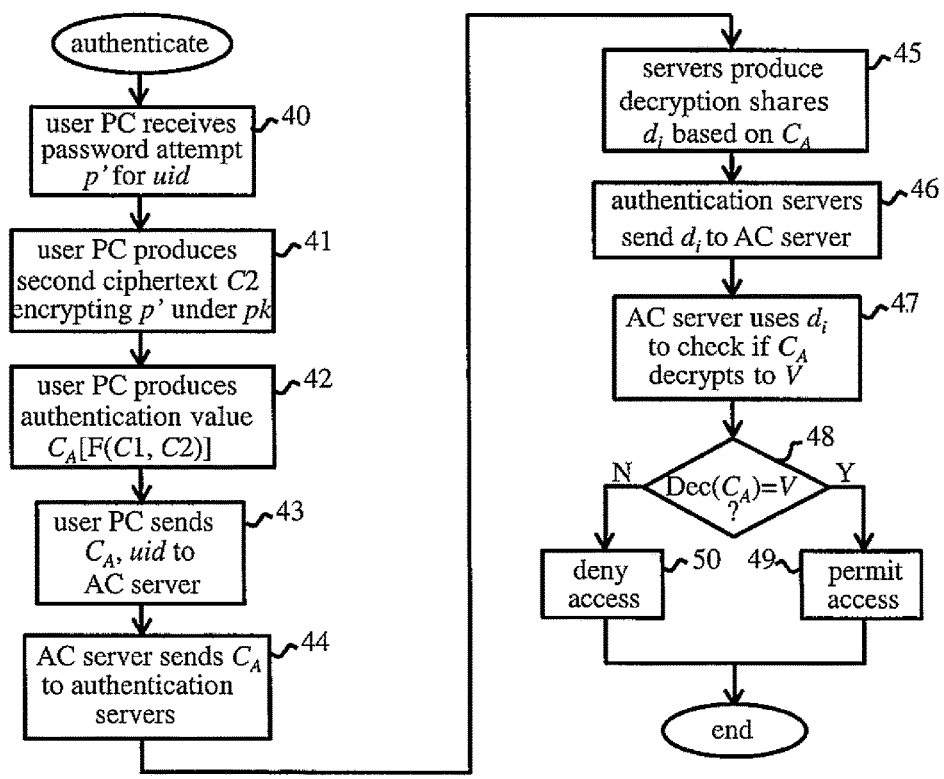
FIG. 4 indicates steps performed in an authentication operation of the system.

FIG. 4 indicates steps of a subsequent authentication operation for a user. The authentication is initiated when a registered user connects to AC server 3 from a user PC 5 via network 6. In step 40, the user inputs a password p' (i.e. an attempt at the user password p) and user ID uid on prompting by user PC 5. In step 41, logic 9 of PC 5 produces a second ciphertext C2 by encrypting the password attempt p' under the public key pk using the homomorphic encryption algorithm Enc. The second ciphertext C2 may encrypt the password attempt p' per se or some function thereof as discussed below. In step 42, logic 9 then produces an authentication value $C_A$. The authentication value $C_A$ comprises a predetermined function, denoted here by F, of the first ciphertext C1 for uid and the second ciphertext C2. (While embodiments may be envisaged where a user PC 5 stores the first ciphertext C1 generated in the setup procedure above, in additional embodiments described below, the first ciphertext C1 for uid is retrieved from AC server 3 for production of the authentication value). The predetermined function F combines the ciphertexts C1 and C2 via the homomorphic operator $\odot$ discussed above as $F(C1, C2)=C1 \odot C2$. The authentication value $C_A[F(C1, C2)]$ is such that, by virtue of the homomorphic property and construction of the first and second ciphertexts from p and p' respectively, the authentication value decrypts to a predetermined value V if the p'=p, i.e. if the password attempt is correct for the user ID uid.

In step 43 of FIG. 4, logic 9 of PC 5 sends the authentication value $C_A$ and user ID uid to AC server 3. In response to receipt of ($C_A$, uid) in step 44, AC logic 13 sends the authentication value $C_A$ via network 6 to at least a subset of the authentication servers $S_1$ to $S_n$. The number of authentication servers here depends on details of the encryption scheme and key-share distribution as discussed further below. In response to receipt of $C_A$ in step 45, each authentication server produces a decryption share $d_i$ dependent on the authentication value $C_A$ using the key-share $sk_i$ thereof. The decryption share $d_i$ can be produced by decrypting the authentication value $C_A$ (or, in additional embodiments below, a function of $C_A$) via a partial decryption algorithm PDec of the homomorphic encryption scheme. If AC server $S_0$ stores a key-share $sk_0$, then AC logic 13 also produces a decryption share $d_0$ in step 45. In step 46, each authentication server $S_i$ which produced a decryption share in step 45 sends the decryption share $d_i$ to AC server 3. In step 47, the AC logic 13 then uses the decryption shares $d_i$ of a plurality of the $\lambda$ servers to determine if the authentication value $C_A$ decrypts to the predetermined value V. If AC server 3 has a key-share $sk_0$, then this plurality of decryption shares will include the AC server's decryption share $d_0$. This determination can be made by using the decryption shares $d_i$ to decrypt the authentication value $C_A$ (or, in additional embodiments, a function of $C_A$) via a decryption algorithm Dec of the homomorphic encryption scheme. If $C_A$ decrypts to V, indicated by a "Yes" (Y) at decision block 48, then the password attempt p' is correct, i.e. p' equals the user password p for uid. In this case, AC logic 9 permits the user access to the database 7 as indicated at step 49, and login is complete. If $C_A$ does not decrypt to V, ("No" (N) at decision block 48), then the password attempt p' is incorrect. The AC logic 9 then denies access at step 50 and may notify the user accordingly.

The above operation provides a secure and efficient authentication scheme in which plaintext user passwords p and password attempts p' are not revealed to server system 2. Passwords and password attempts are only communicated in encrypted form, but the server system can still authenticate passwords due to the homomorphic property of the encryption scheme. Authentication requires cooperation of the AC server and authentication servers using the key-shares $sk_i$, thus frustrating offline attacks. The scheme protects input passwords in all communications with, and within, server system 2, so additional mechanisms to protect passwords (e.g. to prevent servers logging internal traffic which may otherwise reveal passwords to an adversary), are not required. Moreover, user passwords are protected against phishing attacks. In these attacks, users can be lured into attempting authentication at a malicious website, or entering passwords to a decoy service which aims to collect all password attempts, the supplied passwords then being used for impersonation attacks, fraud, etc. The user need only interact with a single server of the authentication system, and only lightweight protocol functionality is required at user computers for operation of the scheme. In addition, the above scheme allows proactive security to be implemented in server system 1 by refreshing (re-sharing) of the secret server key-shares $sk_i$ as discussed further below. This feature further enhances security in that subversion of system 2 would require corruption of all the necessary servers within the same time period between key-refreshes.

The authentication operation for an embodiment of system 1 will now be described in more detail. In this embodiment, the homomorphic encryption scheme is a threshold encryption scheme. Threshold encryption schemes require use of a threshold number t of the key-shares $sk_i$ for decryption of a ciphertext encrypted via the scheme. In more detail, a threshold encryption scheme consists of four algorithms (EKGen, TEnc, PDec, TDec). The key generation algorithm EKGen takes input (G, q, g, k, N), where G is a multiplicative group of prime order q and generator g, and k=(t−1) denotes the maximum tolerated number of malicious servers, and outputs a master public key pk and N partial key (key-share) pairs $(pk_1, sk_1), \ldots, (pk_N, sk_{iv})$. The encryption algorithm TEnc, on input of the public key pk and a message m, outputs a ciphertext C. The partial decryption algorithm PDec, on input of a secret key-share $sk_i$, a public key $pk_i$, and a ciphertext C outputs a decryption share $d_i$. The threshold decryption algorithm TDec, on input of C,pk and j≥t decryption shares $d_{i_1} \ldots d_{i_j}$, outputs a plaintext m or ⊥ (error). Various such threshold encryption schemes are known, an exemplary construction being described in "Threshold Cryptosystems", Desmedt & Frankel, CRYPTO 1989.

Figure 5:
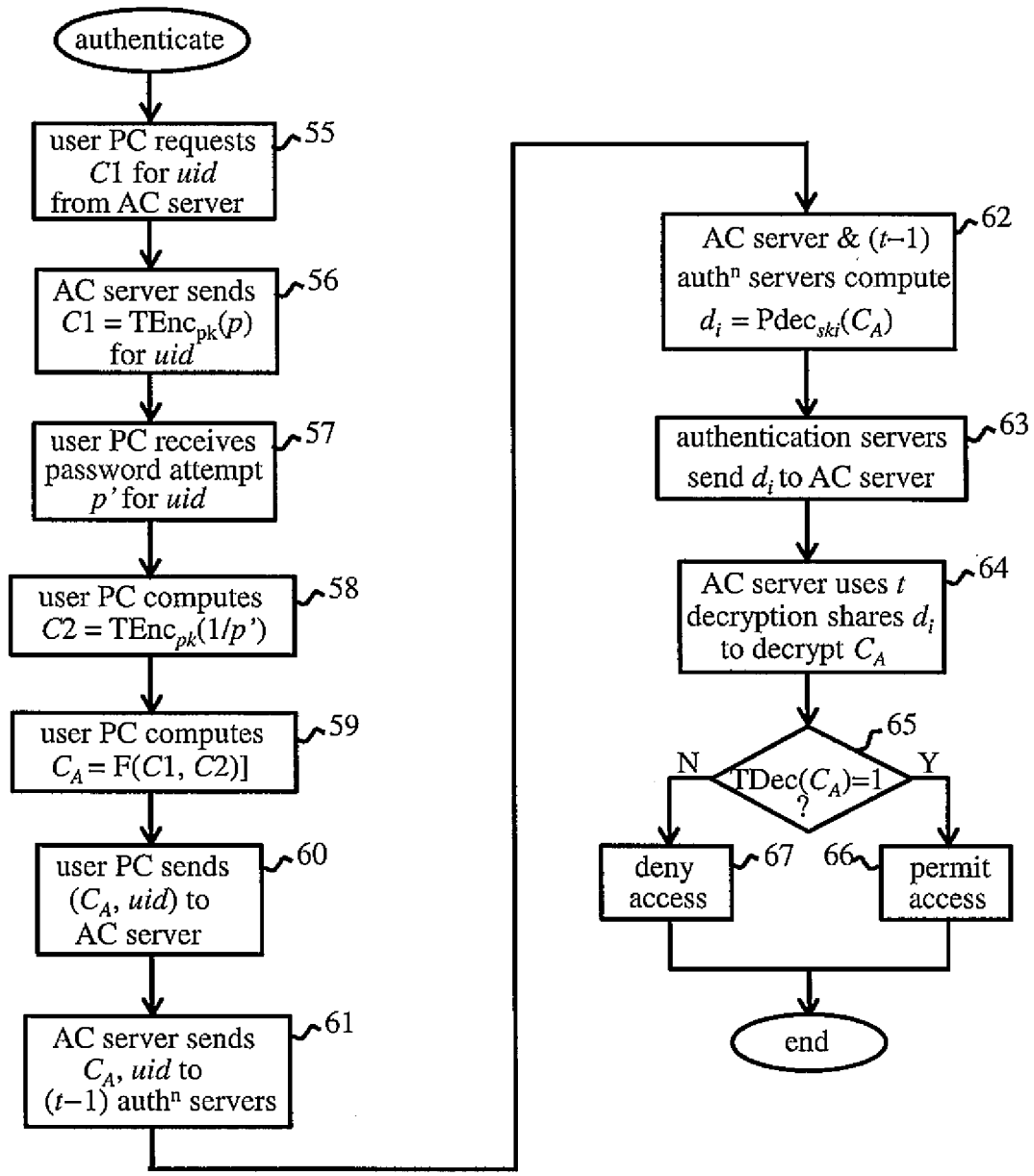
FIG. 5 indicates more detailed steps of an authentication operation in one embodiment.

For use with the threshold scheme, system 2 comprises λ>2 servers and the secret key sk is shared between a plurality q≤λ of the servers, where the threshold number t<q. In an additional embodiment, q=λ whereby AC server 3 stores a key-share $sk_0$ of the secret key sk. In the setup operation of FIG. 3 for this embodiment, the first ciphertext C1 is produced in step 35 by encrypting the user password p per se, i.e. $C1=TEnc_{pk}(p)$. FIG. 5 indicates steps of the authentication operation. This operation is initiated when a user connects to AC server 3 from a user PC 5 and inputs his user ID uid. In step 55, the user PC requests the first ciphertext C1 generated for uid during setup from AC server 3. AC server 3 retrieves the ciphertext C1 for uid from memory and sends it to PC 5 in step 56. In step 57, PC 5 prompts the user to input his password and receives a password attempt p'. In step 58, PC 5 produces a second ciphertext C2 by encrypting the function (1/p') under the public key pk using the homomorphic threshold encryption algorithm TEnc, i.e. $C2=TEnc_{pk}(1/p')$. In step 59, PC 5 computes an authentication value $C_A$ as $C_A$ F(C1, C2)= C1 ⊙C2, where the group operation "•" defined above represents multiplication. Due the homomorphic property, it follows that the authentication value $C_A$ encrypts a quotient of p and p' via the homomorphic encryption algorithm, i.e. $C_A=TEnc_{pk}(p/p')$, whereby $C_A$ decrypts to a predetermined value of V=1 if p'=p. In step 60, PC 5 sends the login data ($C_A$; uid) to AC server 3. In step 61, the AC server sends ($C_A$, uid) to at least (t−1) authentication servers 4. (The authentication servers may be selected here as the first (t−1) servers to respond or using a load balancing scheme among the n authentication servers). In step 62, the AC server and each of the (t−1) authentication servers uses its key-share $sk_i$ to produce a decryption share $d_i$ of $C_A$ as $d_i=PDec_{sk_i}(C_A)$. In step 63, the (t−1) authentication servers send their decryption shares $d_i$ to AC server 3. In step 64, the AC server then uses the t decryption shares $d_{i=0\ to\ t-1}$ to decrypt $C_A$ via $TDec_{pk}(C_A)$. If $C_A$ is found to decrypt to unity at decision block 65, then p/p'=1 and the password attempt p' is correct. The AC server then permits user access to the database 7 at step 66, and login is complete. If $C_A$ does not decrypt to unity, then the password attempt p' is incorrect and the AC server denies access at step 67.

The FIG. 5 operation provides a simple and efficient procedure in which only (t−1)<n of the authentication servers are required to cooperate with the AC server for authentication. In addition, the authentication servers can implement a throttling mechanism for detection of attacks on system 2. Throttling mechanisms are well known in cryptography, providing procedures for monitoring logins by system users and determining based on login behavior if any particular user account should be blocked. Throttling mechanisms generally block user accounts if the login behavior satisfies a predefined criterion indicative of potentially malicious action, e.g. if more than a threshold number of login requests are made within a given time. Authentication servers 4 can thus implement a throttling mechanism based on user IDs uid supplied in step 61 above.

To provide proactive security, each server which stores a key-share $sk_i$ (i.e. all servers 3, 4 in this embodiment) is adapted to periodically refresh its key-share $sk_i$. The time periods, or "epochs", for which the keys $sk_i$ are refreshed may be defined in various ways in the system. For example, the refresh operation may be performed automatically for epochs of a predetermined duration, and/or a new epoch may be initiated in response to detection of an attack on system 2. To refresh the key-shares $sk_i$, the servers 3, 4 run a protocol to re-share (redistribute) the secret key sk between the servers. Various such protocols using proactive secret-sharing techniques are known in the art, an example being described in "Proactive Secret Sharing Or: How to Cope With Perpetual Leakage", Herzberg et al., CRYPTO 1995. Each server thus receives a new key-share $sk_i$ to replace the old key-share which is deleted. The shared secret key sk is unchanged, whereby the new key-shares $sk_i$ are still "compatible" with the master public key pk for use in the new epoch. However, the old key-shares, which may have been compromised in the previous epoch, are no longer usable in the system.

Figure 6:
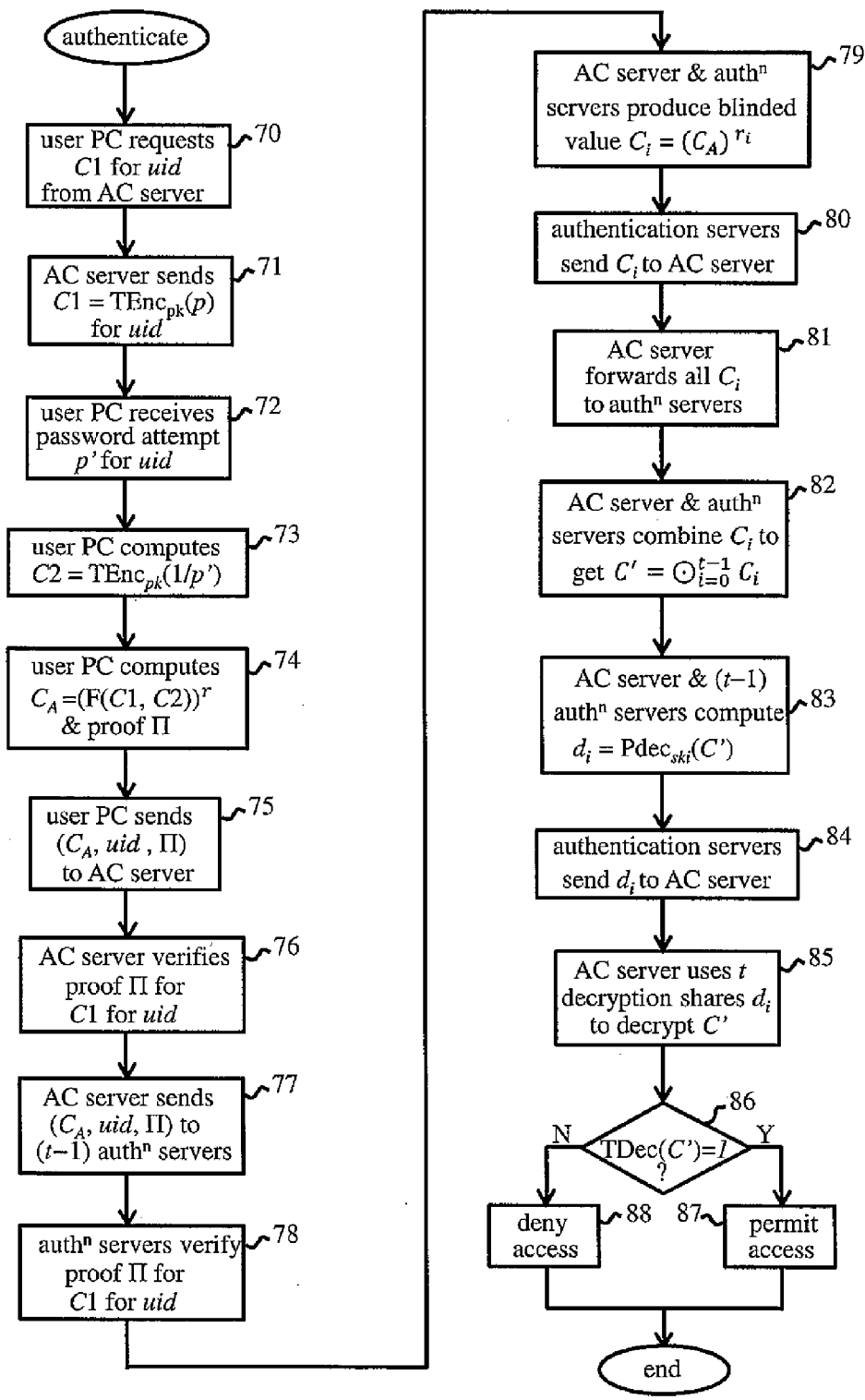
FIG. 6 indicates more detailed steps of an authentication operation in another embodiment.

The authentication operation for another embodiment of system 1 will now be described with reference to FIG. 6. This embodiment again uses a threshold homomorphic encryption scheme in a system of λ>2 servers in which AC server 3 stores a key-share $sk_0$. The setup operation of this embodiment includes steps 38 and 39 of FIG. 3, whereby each authentication server stores the data set {uid:C1}. The first ciphertext C1 is computed in the setup operation as by $C1=TEnc_{pk}(p)$ as before, and the second ciphertext C2 is again computed as $C2=TEnc_{pk}(1/p')$. Steps 70 to 73 of FIG. 6 correspond respectively to steps 55 to 58 of FIG. 5. In step 74, however, the user PC computes an authentication value $C_A$ comprising the predetermined function F of C1 and C2 blinded with a random exponent r. That is, PC 5 chooses a random value r and computes $C_A=(F(C1, C2))^r=(C1 \odot C2)^r$. Due the homomorphic property, it follows that $C_A$ $TEnc_{pk}$ $(p/p')^r$, whereby $C_A$ again decrypts to a predetermined value V of unity if p'=p. In this step, PC 5 also computes a cryptographic proof Π for proving that the authentication value $C_A$ encrypts the second ciphertext C2 as well as the first ciphertext C1 supplied in step 71 for the user ID:

$$\Pi \leftarrow NIZK\{(p',r):C_A=(C1 \odot TEnc_{pk}(1/p'))^r\}(C_A, uid).$$

(Here "NIZK" means "non-interactive zero-knowledge", where "zero-knowledge" indicates that the prover reveals nothing more than is required to be proved, and "non-interactive" means that verification of the proof does not require interaction between the prover and verifier. Such proofs can be implemented in known manner and suitable protocols for implementing the proof will be apparent to those skilled in the art). In particular, the proof Π allows verification that the authentication value $C_A$ comprises the correct first ciphertext C1 for uid and a second ciphertext C2 that is correctly computed from a password attempt.

In step 75, PC 5 sends ($C_A$, uid, Π) to AC server 3. In step 76, the AC server verifies the proof Π in relation to the first ciphertext stored for uid in its data set {uid:C1} If verification fails, the authentication operation is aborted. Otherwise, operation continues to step 77 where AC server 3 sends ($C_A$, uid, Π) to at least (t−1) authentication servers 4 which can be selected as described earlier. In step 78, each authentication server 4 verifies the proof Π in relation to C1 stored for uid in its data set {uid:C1}, and aborts if verification fails. If verification succeeds, operation continues to step 79. Here, AC server 3 and each of the (t−1) authentication servers 4 produce a blinded value by blinding the authentication value $C_A$ with a random exponent $r_i$. That is, each server chooses a random value $r_i$ and computes a blinded value $C_i = (C_A)^{r_i}$. Each authentication server then sends the blinded value $C_i$ to authentication server 3 in step 80. On receipt of blinded values $C_i$ from the (t−1) authentication servers, the AC server forwards each of the t blinded values $C_i$ to each of the (t−1) authentication servers in step 81. In step 82, the AC server and each of the (t−1) authentication servers then combine the t blinded values $C_i$ to produce randomized authentication value as $C' = \odot_{i=0}^{t-1} C_i$. In step 83, the AC server and each of the (t−1) authentication servers uses its key-share $sk_i$ to produce a decryption share $d_i$ of C' as $d_i = \mathrm{PDec}_{sk_i}(C')$. In step 84, the (t−1) authentication servers send their decryption shares $d_i$ to AC server 3. In step 85, the AC server then uses the t decryption shares $d_{i=0\ to\ t-1}$ to decrypt C' via $\mathrm{TDec}_{pk}(C')$. Due to the homomorphic property, if $\mathrm{TDec}_{pk}(C') = 1$ it follows that $\mathrm{TDec}_{pk}(C_A) = 1$ and hence p'=p. If so, (Yes at decision block 86), the AC server then permits user access to the database 7 at step 87, and login is complete. If C' does not decrypt to unity (No at decision block 86), then the password attempt p' is incorrect and the AC server denies access at step 88.

The use of an authentication value $C_A$ which decrypts to V=1 is thus exploited in this embodiment to allow blinding in steps 74 and 79 above, while still permitting authentication via the decryption process. The blinding in step 74 enhances security against corruption of AC server 3. In particular, a malicious AC server cannot send a "wrong" ciphertext C1 in step 71 (e.g. C1=1) and then extract password information from the authentication value received in step 75. Use of the blinded values $C_i$ and C' in steps 79 to 85 ensures security against authentication servers that are fully malicious. In particular, an adversary controlling some, but not all, authentication servers could run fake login sessions in the role of the user to get the remaining honest servers to decrypt ciphertexts of his choice. With the blinded values $C_i$, every server contributes randomness to the ciphertext C'. If there is at least one honest server then the adversary cannot determine the ciphertext C' decrypted in step 85. This provides an exceptionally secure system. No single server can authenticate passwords or learn any password information of users, and even if the AC server and all authentication servers are corrupted, user password attempts are not revealed. As before, throttling can be readily employed in step 78 of this embodiment, and servers can refresh their key-shares for successive epochs. Moreover, the proof Π ensures that the user cannot cheat, despite sending only blinded values to the AC server.

An exemplary implementation of the FIG. 6 scheme is detailed below. All communications may include appropriate servers IDs and session IDs which are omitted here for simplicity.

Initialization

AC server $S_0$ generates threshold keys for all λ servers. That is, $S_0$ creates $(pk, (pk_0, sk_0), \ldots, (pk_n, sk_n)) \xleftarrow{\$} \mathrm{EKGen}(G, q, g, k, n')$ where G, q and g are as defined above and n'=n+1. The secret key-shares $sk_1$ to $sk_n$ are sent to authentication servers $S_1$ to $S_n$ respectively, and $sk_0$ is stored by the AC server $S_0$. The master public key pk and partial public keys $pk_i$ are publically known in the system.

Setup (Account Creation)

On input (uid, p), the user computer U, the AC server $S_0$ and all authentication servers $S_i$ jointly create an account for a user with username uid and password p:

1. U: On input (uid, p), compute $C1 \xleftarrow{\$} \mathrm{TEnc}_{pk}(p)$ and send (uid, C1) to $S_0$.
2. $S_0$: On receiving (uid, C1), check that no record for uid already exists and abort otherwise. Send (uid, C1) to $S_1$ to $S_n$, and store (uid, C1).
3. $S_i$: On receiving (uid, C1) from $S_0$, store (uid, C1).

Login

On input (uid, p'), the user computer U prepares a "blind" verification request for password attempt p' and testing whether p'=p. The request is verified by $S_0$ with the help of (t−1) authentication servers $S_i'$.

1. U: On input (uid, p'), request ciphertext from $S_0$ by sending a login request with uid to $S_0$.
2. $S_0$: On receiving the login request for uid, fetch the threshold public key pk and check that a record (uid, C1) for uid already exists. Abort if no such record exists. Send (uid, C1, pk) to U.
3. U: On receiving (uid, C1, pk) from $S_0$, compute $C_A \leftarrow (C1 \odot C2)^r$ with $C2 = \mathrm{TEnc}_{pk}(1/p')$ for a randomly chosen $r \xleftarrow{\$} Z_q$ (where $Z_q$ is the set of integers from 1 to q) and prove correctness of the computation in $\Pi: \Pi \leftarrow \mathrm{NIZK}\{p', r) : C_A = (C1 \odot \mathrm{TEnc}_{pk}(1/p'))^r\}(C_A, \mathrm{uid})$. Send (uid, $C_A$, Π) to $S_0$.
4. $S_0$: On receiving (uid, $C_A$, Π) from U, verify that the proof Π is correct with respect to the locally stored C1 for uid and pk. If verification succeeds, send (uid, $C_A$, Π) to $S_1'$ to $S_{t-1}'$.
5. $S_i'$: On receiving (uid, $C_A$, Π) from $S_0$, verify that the proof Π is correct with respect to the locally stored C1 for uid and pk. If verification succeeds, compute $C_i = (C_A)^{r_i}$ for a randomly chosen $r_i \xleftarrow{\$} Z_q$. Store $C_i$ and commit to the value by sending (uid, $h_i$) with $h_i \leftarrow H(C_i, \mathrm{uid})$ to $S_0$ where H denotes a cryptographic hash function.
6. $S_0$: On receiving (uid, $h_i$) messages from all (t−1) servers $S_i'$, compute $C_0 = (C_A)^{r_0}$ for a randomly chosen $r_0 \xleftarrow{\$} Z_q$ and $h_0 \leftarrow H(C_0, \mathrm{uid})$. Forward all t hashes (uid, $h_0, \ldots h_{t-1}$) to all servers $S_1'$ to $S_{t-1}'$.
7. $S_i'$: On receiving (uid, $h_0, \ldots, h_{t-1}$) from $S_0$, reveal the ciphertext, i.e. send (uid, $C_i$) to $S_0$.
8. $S_0$: On receiving (uid, $C_i$) ciphertexts from all (t−1) servers $S_i'$, forward them and $C_0$ as (uid, $C_0, \ldots, C_{t-1}$) to all servers $S_1'$ to $S_{t-1}'$.
9. $S_i'$: On receiving (uid, $C_0, C_{t-1}$) from $S_0$, check if $h_i = H(C_i, \mathrm{uid})$ for i=0 to (t−1). If so, combine the t ciphertexts $C_i$ to the final ciphertext $C' \leftarrow \odot_{i=0}^{t-1} C_i$ and compute a decryption share $d_i \leftarrow \mathrm{PDec}_{sk_i}(pk_i, C')$. Finally, send (uid, $d_i$) to $S_0$.
10. $S_0$: On receiving (uid, $d_i$) from all (t−1) servers $S_i'$, compute $d_0 \leftarrow \mathrm{PDec}_{sk_0}(pk_0, C')$ and use the threshold decryption algorithm TDec to finally verify whether the passwords match. That is, compute $C' \leftarrow \odot_{i=0}^{t-1} C_i$ and $x \leftarrow \mathrm{TDec}_{pk}(C', d_{i=0\ to\ t-1})$. If x=1, then p'=p and the user can be granted access.

The above implementation allows all servers to verify the blinded value $C_i$ of every server by verifying that the hash value $h_i = H(C_i, \mathrm{uid})$ is correct with respect to $C_i$. In spite of the blinding, the user cannot successfully authenticate without knowing the correct password. As long as at most (t−1)

of the λ servers are corrupt, they are not able to reconstruct user passwords or run offline attacks against the accumulated authentication data. Even if all λ servers are hacked, they still cannot learn password attempts of users. In step 5 of the login procedure, the authentication servers can apply a throttling mechanism as previously described. Proactive security via refresh of key-shares further enhances security as explained above.

Many changes and modifications can of course be made to the exemplary embodiments described. For example, while a threshold encryption scheme is used above, other systems may employ an "N-out-of-N" scheme in which all N key-shares $sk_i$ of secret key sk are required for decryption. Also, the AC server may not store a key-share $sk_0$ in some embodiments. The number of authentication servers required for the login protocol will vary accordingly in such embodiments.

The first and second ciphertexts can be constructed in various ways to obtain the quotient p/p' (or alternatively p'/p) via the function F. The FIG. 5 embodiment can be modified for predetermined values V other than unity by modifying the quotient accordingly. The homomorphic property of the encryption scheme may also be based on group operations "•" other than multiplication.

The resource protected by AC server 3 may in general comprise any resource to which user access is restricted, e.g. an application, service, data, device, network or any other facility or combination of facilities. Steps of flow diagrams may be performed in a different order to that shown, and some steps may be performed concurrently as appropriate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    sending by an access control server an authentication value to at least a subset of a set of authentication servers,
        wherein the access control server is one of λ≥2 servers in a system and the set of authentication servers are others of the λ≥2 servers,
        wherein the access control server stores, for each of a plurality of user IDs, a first ciphertext which has been produced by encrypting a user password associated with a respective user ID under a public key pk using a homomorphic encryption algorithm, and
        wherein the sending is performed in response to receipt from a user computer of a user ID and the authentication value which was previously determined using a predetermined function of a first ciphertext for that user ID and a second ciphertext produced by encrypting a password attempt under the public key pk using a homomorphic encryption algorithm such that the authentication value decrypts to a predetermined value if the password attempt equals the user password for that user ID;
    receiving, by the access control server and from each one of the authentication servers in the subset, a decryption share dependent on the authentication value and produced by a corresponding one of the authentication servers using a key-share $sk_i$ thereof,
        wherein each authentication server stores a respective key-share $sk_i$ of a secret key sk, shared between a plurality q of the λ servers, of a cryptographic key-pair (pk, sk) where pk is the public key of the key-pair;
    using by the access control server at least the decryption shares of the subset of the authentication servers to determine if the authentication value decrypts to the predetermined value, if so permitting access to the resource by the user computer.

2. The method of claim 1, wherein the predetermined function and the first and second ciphertexts are constructed such that the authentication value encrypts a quotient of the user password and the password attempt via the homomorphic encryption algorithm.

3. The method of claim 2, wherein the predetermined value is 1.

4. The method of claim 3, wherein the authentication value comprises the predetermined function of the first and second ciphertexts blinded with a random exponent r.

5. The method of claim 3, further comprising:
    receiving by the access control server a blinded value from each of at least the subset of authentication servers, wherein a blinded value has been produced by a corresponding one of the subset of authentication servers by blinding the authentication value with a random exponent $r_i$; and
    sending by access control server received blinded values to each of the authentication servers so that each authentication server has blinded values from the subset of authentication servers, and wherein the decryption shares received by the access control server authentication server are produced by corresponding authentication servers by decrypting a randomized authentication value using the secret key-share $sk_i$ thereof, wherein the randomized authentication value is produced by corresponding authentication servers by the combining the blinded values.

6. The method of claim 1, wherein λ≥2 and the encryption algorithm is an encryption algorithm of a threshold encryption scheme requiring a plurality t<q of the key-shares $sk_i$ for decryption, and wherein sending further comprises sending by the access control server the authentication value to at least (t−1) of the authentication servers and using further comprises using the decryption shares of t of the λ servers to determine if the authentication value decrypts to the predetermined value.

7. The method of claim 6, wherein each of the λ servers stores a respective key-share $sk_i$, and wherein the method further comprises producing by the access control server a decryption share and using the decryption share with the other decryption shares from the subset to determine if the authentication value decrypts to the predetermined value.

8. The method of claim 1, further comprising:
    verifying, in response to receipt with the authentication value of a cryptographic proof that the authentication value encrypts the second ciphertext and the first ciphertext for the user ID, by the access control server the proof before sending the authentication value to the authentication servers.

9. The method of claim 8, further comprising:
    sending by the access control server the cryptographic proof with the authentication value to the authentication servers, wherein each authentication server in the subset verifies the proof before producing the decryption share.

10. The method of claim 1, further comprising:
sending, in response to receipt from the user computer of the user ID, by the access control server the first ciphertext for that user ID to the user computer for production of the authentication value.

11. The method of claim 1, further comprising:
periodically refreshing, by each server which stores a key-share $sk_i$, a corresponding key-share $sk_i$.

12. A method, comprising:
receiving at an authentication server an authentication value from an access control server,
   wherein the authentication server is one of a set of authentication servers, the access control server is one of $\lambda \geq 2$ servers in a system and the set of authentication servers are others of the $\lambda \geq 2$ servers,
   wherein each authentication server stores a respective key-share $sk_i$ of a secret key sk, shared between a plurality q of the $\lambda$ servers, of a cryptographic key-pair (pk, sk) where pk is a public key of the key-pair, and
   wherein the authentication value was previously determined by a user computer using a predetermined function of a first ciphertext for a user ID and a second ciphertext produced by encrypting a password attempt under the public key pk using a homomorphic encryption algorithm such that the authentication value decrypts to a predetermined value if the password attempt equals the user password for that user ID;
producing, by the authentication server and in response to receipt of the authentication value, a decryption share dependent on the authentication value using the key-share $sk_i$ for the authentication server; and
sending by the authentication server the produced decryption share to the access control server for use by the access control server to determine whether to permit access to a resource by the user computer.

13. The method of claim 12, wherein the predetermined function and the first and second ciphertexts are constructed such that the authentication value encrypts a quotient of the user password and the password attempt via the homomorphic encryption algorithm.

14. The method of claim 13, wherein the predetermined value is 1.

15. The method of claim 14, wherein the authentication value comprises the predetermined function of the first and second ciphertexts blinded with a random exponent r.

16. The method of claim 14, further comprising:
producing, by the authentication server and in response to receipt of the authentication value, a blinded value by blinding the authentication value with a random exponent $r_i$;
sending by the authentication server the blinded value to the access control server;
receiving, by the authentication server and from the access control server, blinded values for the other authentication servers in a subset of the set of authentication servers;
combining the blinded values to produce a randomized authentication value; and
producing the decryption share further comprises producing by the authentication server the decryption share by decrypting the randomized authentication value using the secret key-share $sk_i$ for the authentication server.

17. The method of claim 14, wherein:
the authentication server stores the first ciphertext for the user ID;
the method further comprises:
   receiving by the authentication server a cryptographic proof with the authentication value, wherein the cryptographic proof indicates that the authentication value encrypts the second ciphertext and the first ciphertext for the user ID; and
   verifying by the authentication server the proof before producing the decryption share.

18. The method of claim 14, further comprising:
periodically refreshing by the authentication server the key-share $sk_i$.

19. A method, comprising:
in a user computer having previously produced a first ciphertext by encrypting a user password associated with a user ID under a public key pk using a homomorphic encryption algorithm and previously sent the first ciphertext to an access control server, producing a second ciphertext by encrypting a password input by a user having the user ID under the public key pk using the homomorphic encryption algorithm,
   wherein the access control server is part of a system shaving $\lambda \geq 2$ servers and comprising the access control server and a set of authentication servers,
   wherein at least each authentication server stores a respective key-share $sk_i$ of a secret key sk, shared between a plurality q of the $\lambda$ servers, of a cryptographic key-pair (pk, sk) where pk is a public key of the key-pair;
producing by the user computer an authentication value comprising a predetermined function of the first ciphertext for that user ID and the second ciphertext such that the authentication value decrypts to a predetermined value if the password equals the user password for the user ID;
sending by the user computer the authentication value and the user ID to the access control server via a network; and
accessing or not accessing by the user computer a resource on the network based on response from the access control server.

20. The method of claim 19, further comprising:
requesting by the user computer the first ciphertext for the user ID from the access control server via the network, and producing the authentication value using the first ciphertext received from the access control server.

21. The method of claim 19, wherein the predetermined function and the first and second ciphertexts are constructed such that the authentication value encrypts a quotient of the user password and the password via the homomorphic encryption algorithm.

22. The method of claim 21, wherein the predetermined value is 1, and wherein the method further comprises producing at the user computer the authentication value by blinding the predetermined function of the first and second ciphertexts with a random exponent r, producing a cryptographic proof that the authentication value encrypts the second ciphertext and the first ciphertext for the user ID, and sending the cryptographic proof to the access control server.

* * * * *